(12) United States Patent
Jeffryes

(10) Patent No.: US 6,519,533 B1
(45) Date of Patent: Feb. 11, 2003

(54) SEISMIC DATA PROCESSING METHOD FOR DATA ACQUIRED USING OVERLAPPING VIBRATORY SWEEPS

(75) Inventor: Benjamin Peter Jeffryes, Histon (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/936,767
(22) PCT Filed: Mar. 15, 2000
(86) PCT No.: PCT/GB00/00952
  § 371 (c)(1),
  (2), (4) Date: Jan. 16, 2002
(87) PCT Pub. No.: WO00/57208
  PCT Pub. Date: Sep. 28, 2000

(30) Foreign Application Priority Data

Mar. 19, 1999 (GB) .............................................. 9906248

(51) Int. Cl.[7] .............................................. G06F 19/00
(52) U.S. Cl. ............................................ 702/17; 703/5
(58) Field of Search ...................... 702/17, 14; 367/47, 367/75, 72; 340/15.5; 703/5

(56) References Cited

U.S. PATENT DOCUMENTS

| | | | |
|---|---|---|---|
| 3,398,396 A | 8/1968 | Embree ...................... | 340/15.5 |
| 4,882,713 A | 11/1989 | Hughes ........................ | 367/47 |
| 5,410,517 A | 4/1995 | Andersen ..................... | 367/75 |
| 5,850,622 A | 12/1998 | Vassiliou ..................... | 702/17 |

FOREIGN PATENT DOCUMENTS

| | | |
|---|---|---|
| GB | 2 289 336 A | 11/1995 |
| WO | 96/31788 A1 | 10/1996 |

OTHER PUBLICATIONS

Rozemond, H J, Slip–sweep acquisition, 66th Annual meeting of the SEG, Nov. 10–15, 1996, Denver, ACQ 3.2, pp. 64–67.

Wams, J and Rozemond, J Recent developments in 3–D acquisition techniques using vibroseis in Oman, Leading Edge, vol. 17 No. 8, Aug. 1998, pp 1053–1063.

Smith, M J T and Barnwell, T P, Exact Reconstruction Techniques for Tree–Structured Subband Coders, IEEE Transactions on Acoustics, Speech and Signal Processing, vol. ASSP–34, No. 3, Jun. 1986, pp. 434–441.

Oppenheim, A V and Schafer, R W, Digital Signal Processing, Prentice–Hall, 1975, pp. 255–269.

Primary Examiner—Edward Lefkowitz
Assistant Examiner—Victor J. Taylor
(74) Attorney, Agent, or Firm—William L. Wang; William B. Batzer; John J. Ryberg

(57) ABSTRACT

A system and method for attenuating noise in vibroseis data acquisition. In particular, according to the invention, several preferred methods are discloses that are particularly useful for attenuating noise in seismic data acquired by slip sweep vibroseis techniques. The techniques disclosed involve band-splitting in the time-frequency domain using mirror-filtering, such as a quadrature mirror filter. A noise estimate is made according to which the data is normalized and summed. The time frequency data then reconstructed and transformed back into time domain for further processing.

30 Claims, 12 Drawing Sheets

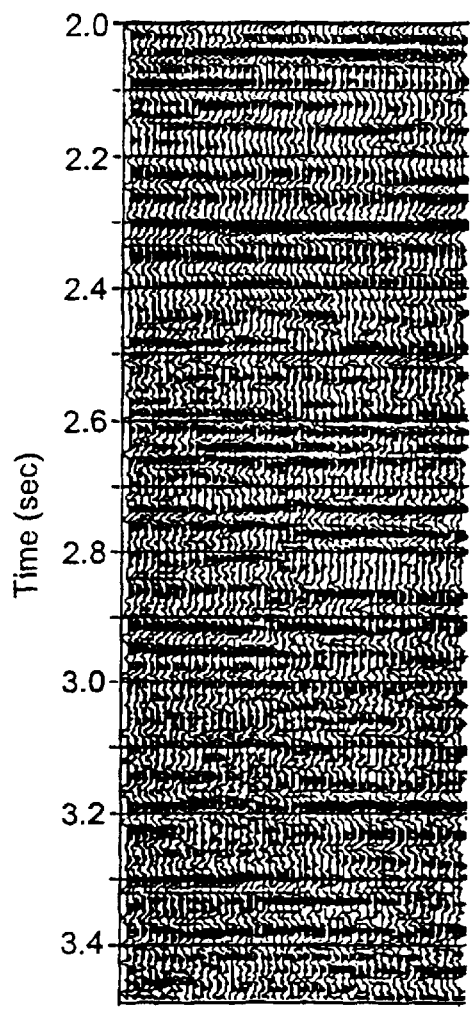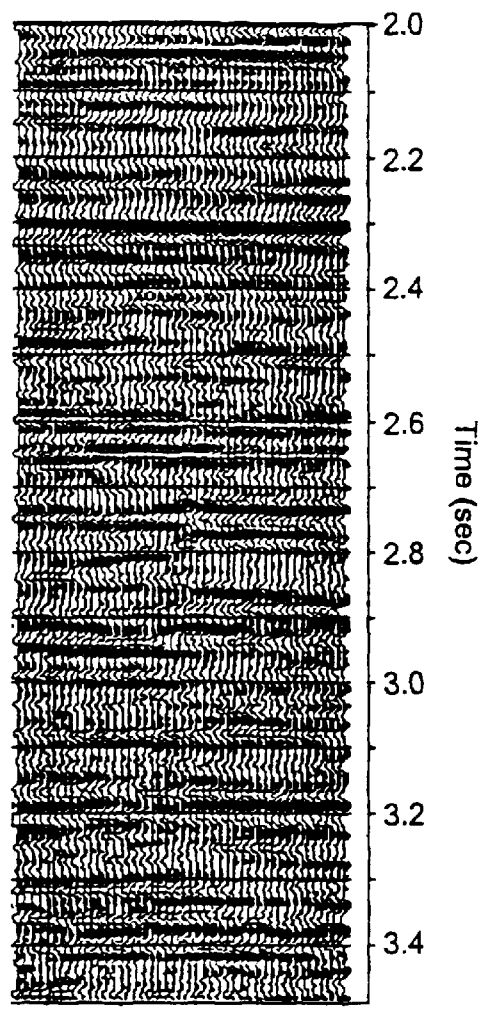
Fig. 13
(prior art)
Fig. 14

SEISMIC DATA PROCESSING METHOD FOR DATA ACQUIRED USING OVERLAPPING VIBRATORY SWEEPS

FIELD OF THE INVENTION

The present invention pertains to the field of seismic data acquisition and processing. More particularly the present invention relates to techniques and systems for attenuating noise in data collected using vibroseis acquisition methods.

BACKGROUND OF THE INVENTION

In current common practice, seismic surveys using vibroseis sources are carried out using time-separated vibratory sweeps. The delay between one sweep finishing and the next sweep starting is at least the listening time of the survey. If this delay is not present then energy from one sweep in the form of harmonics can appear on the preceding shot record as noise. Thus, according to conventional practice there is a time delay between sweeps that is at least the sweep time plus the listening time. This delay time has been found to contribute significantly to the cost of the survey. Accordingly, a method to effectively reduce the delay time, without the detrimental effects of increased noise could result in significant cost savings.

Recently a technique known as slip-sweep acquisition has been developed as a method for speeding up seismic acquisition. By allowing sweeps to overlap in time, but ensuring that at least the listening time elapses between sweep start times, the seismic records are still separated in time after correlation. In some early tests of the technique in Oman, it was found that harmonic noise from the subsequent sweep did not result in appreciable noise on the final seismic image when multiple traces were summed at the post-migration stack.

See, e.g. Rozemond J, (1996) "Slip-sweep acquisition", in *Technical Abstracts of the 66$^{th}$Annual meeting of the SEG*, Nov. 10–16$^{th}$, ACQ 3.2. Since the harmonic noise adds together incoherently and the signal component adds coherently, in that case visible signs of harmonic noise were apparently removed by the summation process.

However, it has been found from experimental tests performed where the near surface is very different to Oman, that appreciable harmonic energy can carry forward to the final stacked image. This noise can be visually very disturbing as it can have a very different frequency content than the signal. Typically, the harmonic noise that appears late in the record has more high frequencies present than the signal. In a normal wiggle display, this changes the visual character of the record substantially.

Thus, slip-sweep acquisition has the great advantage of reducing the overall time necessary to complete a fixed number of sweeps. One major problem, however, is the noise introduced from one or more of the subsequent sweeps.

A technique of slip-sweep acquisition is described in Wams, J. and Rozemond J. (1998), Recent Developments in 3-D acquisition using vibroseis in Oman, *Leading Edge* 17 no 8, pp 1053–1063, and also in Rozemond (1996). In Rozemond (1996), a technique is mentioned in which random variations in the delay time are introduced in an effort to eliminate noise from the overlapping sweeps. However, using this technique alone has been found to only be of limited effectiveness.

Another attempt at providing an acquisition method with reduced delay time allows sweeps to follow one another without the listening time delay. See, U.S. Pat. No. 5,410, 517. This technique relies on phase cancellation to reduce noise from other sweeps. However, this technique is of only limited effectiveness and it suffers from the disadvantage that, in order to address both the $2^{nd}$ and $3^{rd}$ order harmonics, at least 4 sweeps per location are required. Performing additional sweeps is particularly problematic since it substantially increases the time needed and cost to perform the data acquisition.

SUMMARY OF THE INVENTION

Thus, it is an objective the present invention to provide a method of slip-sweep data acquisition which has a substantial reduction in noise due to overlapping sweeps while having little or no impact on the time required to perform the data acquisition.

According to a preferred embodiment of the invention, a method and apparatus is provided for reducing the effects of noise in seismic data acquired from overlapping vibratory sweeps. In particular, raw data traces are received which represent sensor recordings of earth vibrations caused by vibratory sweeps. The raw data also contains some noise caused by harmonic energy from one or more other, overlapping vibratory sweeps. The harmonic noise energy is caused by a subsequent vibratory sweep that begins while the initial sweep is still underway.

The data are recorded and stored as plurality of raw data traces representing received vibrations caused by the vibratory sweep and at least some noise from the subsequent vibratory sweeps. The raw data traces are processed such that reflections from substantially the same spatial position occur at substantially the same point in time. The data is digitally transformed preferably using a mirror filtering technique to generate a number of reduced bandwidth traces in the time frequency domain. The reduced bandwidth traces are mathematically equivalent to the time domain data, and each reduced-bandwidth trace represents a subset of the frequencies present in the time domain data. Noise estimates are calculated based on a running average over a predetermined portion of the reduced-bandwidth trace. The reduced-bandwidth traces are then summed and normalized according to the noise estimates.

Finally, the summed and normalized data is digitally transforming back into the time domain, generating a reduced noise data trace which is substantially a mathematical equivalent to the summed and weighted trace. The reduced noise data trace has less noise caused by the second vibratory sweep than original data trace, and it is therefore more suitable for further processing and analysis to determine therefrom characteristics of an earth structure.

According to an another preferred embodiment of the invention, a method provided for reducing the effects of noise in seismic data acquired from overlapping vibratory sweeps in which after processing the raw data traces, the seismic time domain data are convolved to generate transformed time domain data having the harmonic noise concentrated in time. The convolution is preferably performed with a synthetic sweep. Noise estimates are calculated, and the transformed data traces are summed and normalized according to the noise estimates. Finally, the summed and normalized data is deconvolved to generate reduced noise time domain data which has generally less harmonic noise caused by the second vibratory sweep than said first time domain data.

DESCRIPTIONS OF THE DRAWINGS

FIG. 13 illustrates an example of seismic data processed according to the prior art;

FIG. 14 illustrates an example of seismic data processed according to the invention;

DETAILED DESCRIPTION OF THE INVENTION

Figure 1:
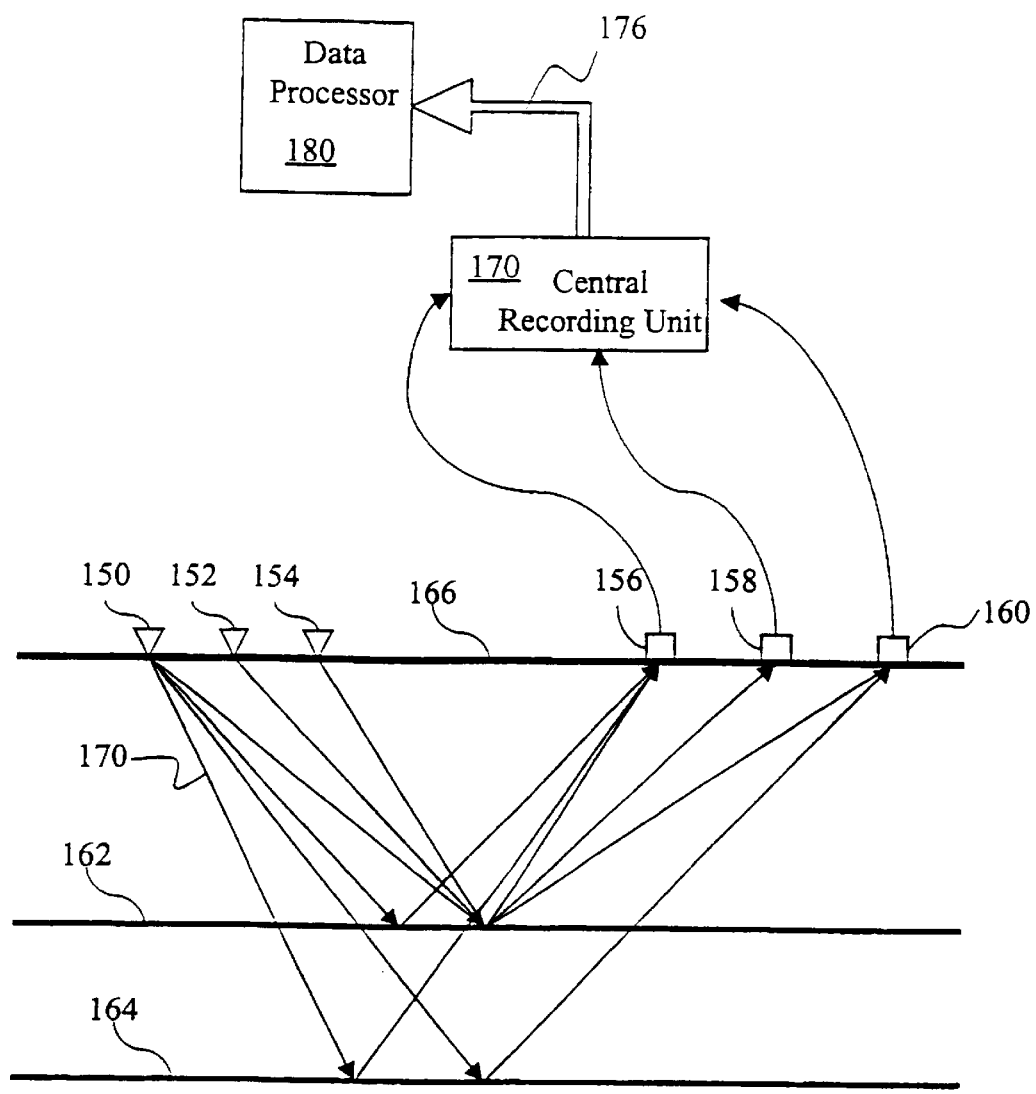
FIG. 1 illustrates an example of a vibroseis data acquisition and processing system, according to the invention.

FIG. 1 is a schematic illustration of a vibroseis data acquisition and processing system. Vibrator groups 150, 152, and 154 are depicted which impart vibrations into the earth at its surface 166. Vibrator groups may comprise any number of vibrators, and groups of up to six vibrators are common. While three vibrator groups are depicted for simplicity, other numbers of vibrator groups, such as two or four are commonly used. Typically, the vibroseis technique is carried out on land, but it also has applicability in the certain marine environments. In the case of land data acquisition, truck mounted vibrators can be used to provide the source seismic signal. The vibrators generate an oscillatory pattern that changes frequency over a predetermined amount of time, typically 10–20 seconds. This vibration pattern is referred to as a vibratory sweep. The vibrations imparted onto the surface 166 travel through the earth; this is schematically depicted in FIG. 1 as arrows 170. The vibrations reflect off of certain subterranean surfaces, here depicted as surface 162 and surface 164, and eventually reach and are detected by geophones 156, 158, and 160. In general, there will be many geophones, or other suitable sensors, distributed across a local area in a predetermined pattern that facilitates data acquisition. Since it takes time for the vibrations to propagate through the earth and reach the geophones, the geophones continue to listen for the vibrations for some period of time, called the listening time, after the vibrator has stopped vibrating. Typically listening time is 2–8 seconds.

Figure 2:
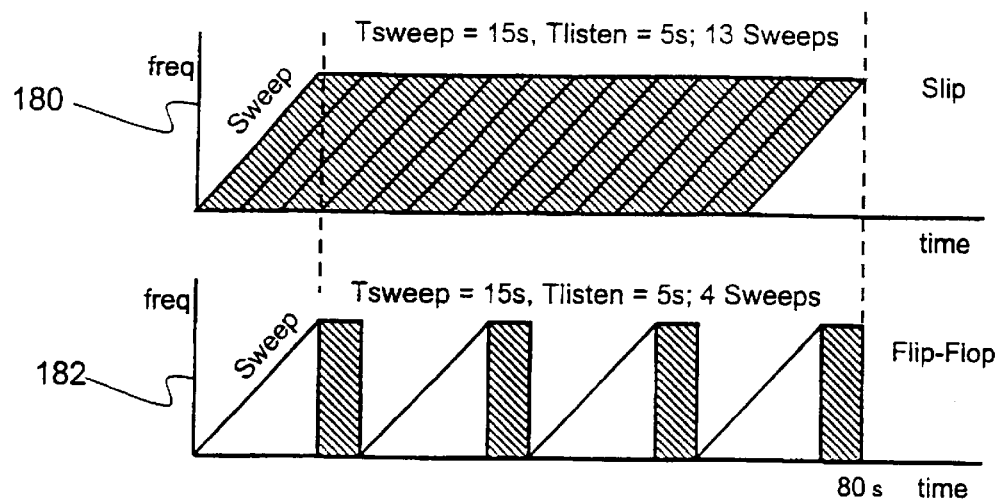
FIG. 2 illustrates an example an overlapping data acquisition technique, according to the invention.

In the case of conventional non-overlapping vibroseis data acquisition techniques, the vibrator groups sweep one at a time. After one vibrator group finishes a sweep, the next vibrator group waits for at least the listening time before starting the next sweep. This common technique is depicted in FIG. 2 in graph 185. In this case the sweep time is 15 seconds and the listening time is 5 seconds.

In the case of slip-sweep data acquisition, more than one vibrator group is allowed to sweep during the same time in a staggered overlapping sequence. Typically, the delay between the start of one sweep and the next should be at least as long as the listening time. A significant advantage of the slip-sweep technique can be seen in FIG. 2. Whereas in non-overlapping data acquisition a maximum of four sweeps can be carried out in an 80 seconds interval, using slip sweeping up to 13 sweeps can be carried out in the same interval. Thus, in general, it has been found that slip-sweep data acquisition can significantly increase the productivity and decrease the cost of vibroseis data acquisition.

However, it has been found that a significant amount of harmonic noise may be present in a signal acquired by slip-sweep or overlapping sweep techniques. This harmonic noise is primarily caused by higher harmonic frequencies introduced by subsequent, but nevertheless overlapping vibratory sweeps. Furthermore, this type of harmonic noise is unique to slip-sweep data acquisition. Advantageously, the present invention has been found to be particularly effective at reducing the effects of this type of harmonic noise.

Referring again to FIG. 1, geophones 156, 158, and 160 convert the vibrations into electrical signals and transmit these signals to a central recording unit 170, usually located at the local field site. The central recording unit typically has data processing capability such that it can perform a cross-correlation with the source signal thereby producing a signal having the recorded vibrations compressed into relatively narrow wavelets or pulses. In addition, central recording units may provide other processing which may be desirable for a particular application. Once the central processing unit performs the correlation and other desired processing, it typically stores the data in the form of time-domain traces on a magnetic tape. The data, in the form of magnetic tape is later sent for processing and analysis to a seismic data processing center, typically located in some other geographical location. The data transfer from the central recording unit 170 in FIG. 1 is depicted as arrow 176 to a data processor 180.

Figure 3:
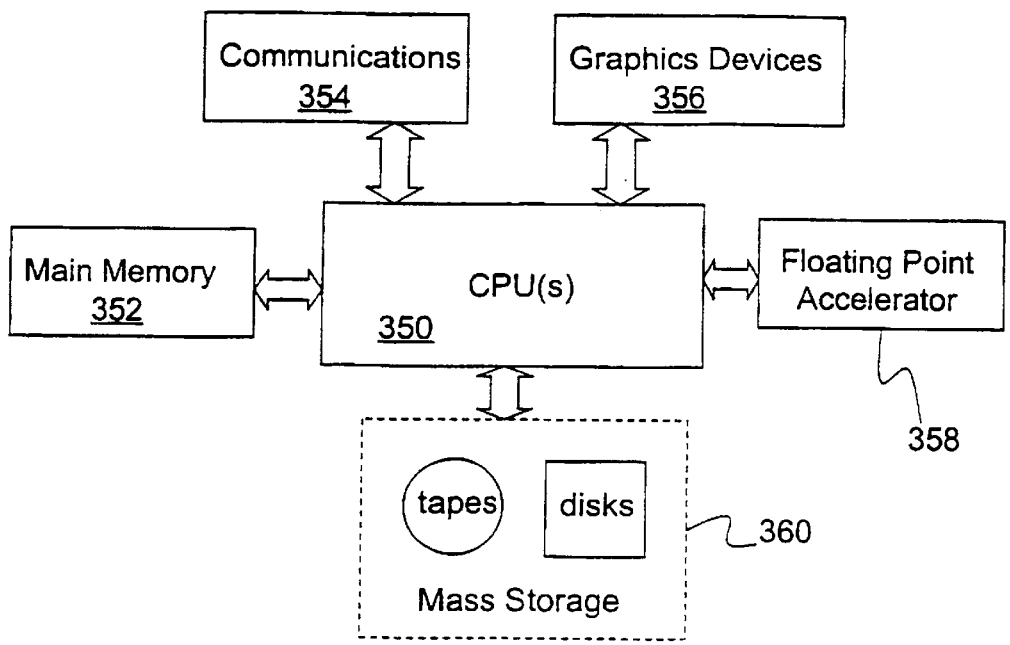
FIG. 3 illustrates an example of a data processor suitable for processing seismic data, according to the invention.

The data processor 180 is implemented on a digital computer configured to process large amounts of seismic data. For example, FIG. 3 illustrates one possible configuration for data processor 180. The data processor typically consists of one or more central processing units 350, main memory 352, communications or I/O modules 354, graphics devices 356, a floating point accelerator 358, and mass storage such as tapes and discs 360.

Figure 4:
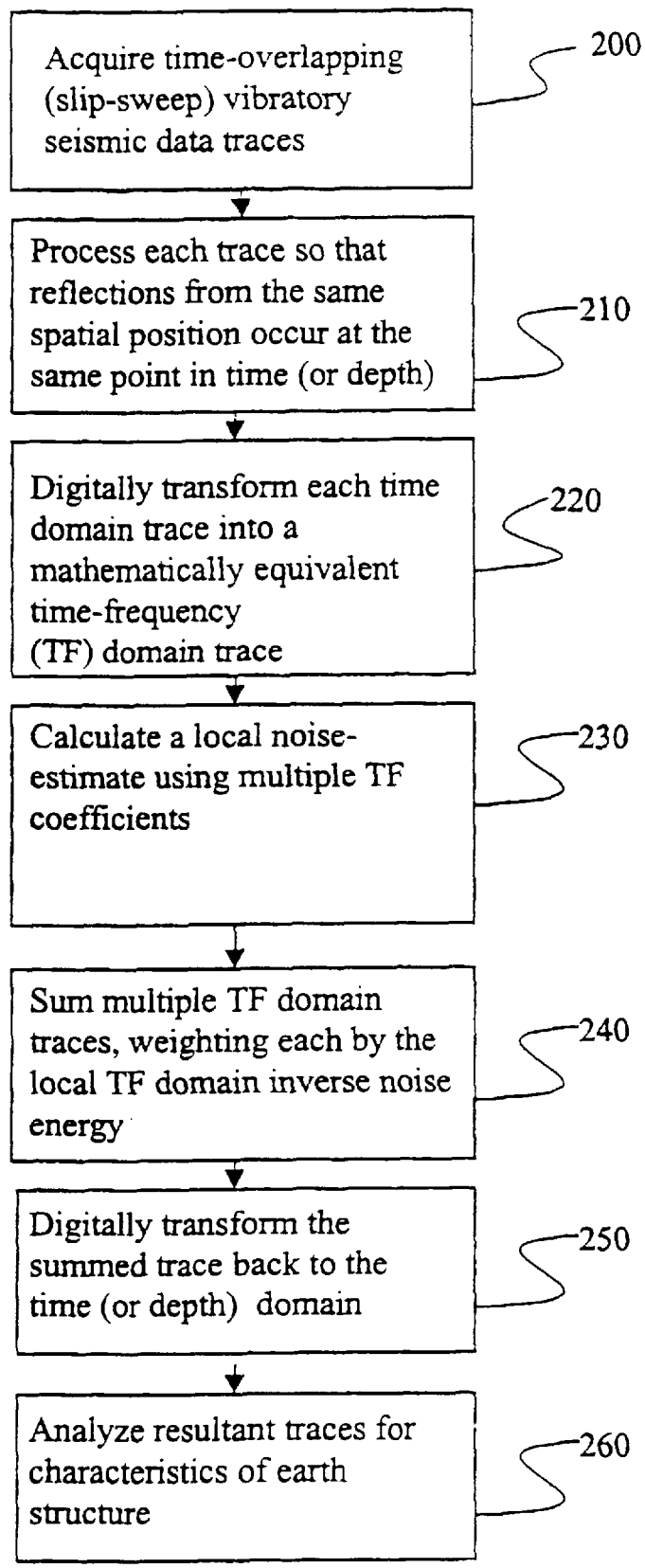
FIG. 4 illustrates an example of a data acquisition and noise reduction process, according to the invention.

FIG. 4 illustrates, in general, the data acquisition and noise reduction process according to the present invention. According to a preferred embodiment of the invention, steps 210 through 250 will be carried out in a data processor such as depicted in FIG. 3.

Figure 5:
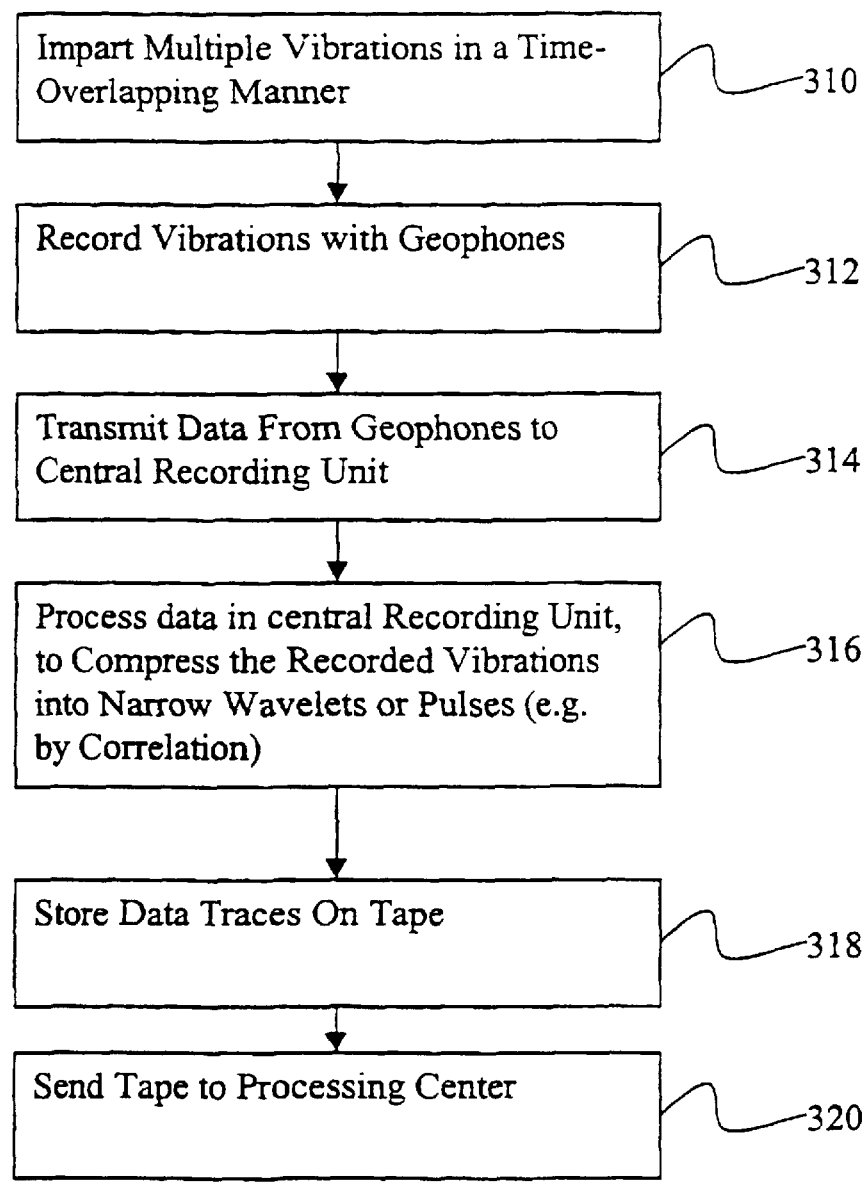
FIG. 5 illustrates in greater detail an example of the general steps followed in acquiring time overlapping or slip-sweep vibratory seismic data traces, according to the invention.

Referring to FIG. 4, in step 200, the slip-sweep data traces are acquired. As mentioned, it is believed that this data may contain a significant amount of noise caused by harmonic frequencies of subsequent vibratory sweeps. FIG. 5 illustrates in greater detail the general steps typically followed in acquiring time overlapping or slip-sweep vibratory seismic data traces. As shown in FIG. 5, multiple vibratory sweeps are executed in a time-overlapping manner in step 310. As mentioned, it is preferred that the delay between the start of one sweep and the start of the next sweep be at least as long as the listening time. In step 312, the vibrations are recorded by the geophones. In step 314, the data from the geophones is transmitted to the central recording unit. Next, in step 316, the central recording unit processes the data to compress the recorded vibrations into narrow wavelets or pulses. This may be done by performing a cross-correlation of the recorded signal with the pure source signal. In step 318, the correlated data is stored in the form of time-domain data traces on a magnetic tape or other suitable medium. In step 320, the tape is sent to the processing center for processing and analysis. Alternatively, the data could be transmitted electronically from the recording unit to the processing center for analysis.

Referring again to FIG. 4, the next step, 210, is to process each trace so that reflections from the same spatial position occur at the same point in time. There are number of known techniques which can be implemented here. One common method is known as common-midpoint (or CMP) gather. To implement CMP gather the arrangement of vibrator locations and geophone locations should be such that many different vibrator and geophone positions share the same common mid-point. Upon stacking and averaging signals having a common mid-point, there will be considerable redundancy and the noise will be substantially reduced. Alternative methods to CMP gather are contemplated and may be used in step 210, such as common depth-point (CDP) gather. The result of step 210 will be a plurality of time-domain traces, or in the case of CDP gather, depth-domain traces.

In step 220, each time domain trace is digitally transformed into a mathematical equivalent time-frequency domain trace. Advantageously, the use of a frequency band-splitting technique has been found to significantly improve the ability to attenuate noise of the type caused by harmonic frequencies of subsequent vibratory sweeps in slip-sweep data acquisition. Due to the fact that this type of harmonic noise is caused by subsequent vibrators sweeping through various frequencies, only a small proportion of signal traces will have harmonic noise present at any one time and frequency. It has been found that typically, the harmonic noise appears late in the record and has more high frequency power present than the signal.

According to a preferred embodiment of the invention, the diversity stack and QM filters are combined to improve the effectiveness of noise attenuation. In a conventional implementation of the diversity stack the instantaneous power in each time series is estimated using a long running window (0.25–1 seconds).

A drawback of this conventional technique is that it does not take into account the frequency content of the signal and the noise. Seismic vibrators emit a swept-frequency signal, either sweeping upwards or downwards in frequency. If, early in the sweep, there is loud noise at a frequency that has not yet been produced by the vibrator, then it cannot interfere with the signal. The diversity stack however will down-weight these data.

Advantageously, according to the present invention, using a technique such as the QM splitting filter, the time series to be stacked may be split into a number of sub-series, each of which has a narrow bandwidth. Applying the diversity stack separately to each sub-series ensures that data are only down-weighted at frequencies close to those at which noise is present. The number of bands into which the data are split is preferably not too large; otherwise the running-window power calculation will be based on very few points. On the other hand, there should be a sufficient number of bands such that the spectrum within each band is fairly flat.

After applying the diversity stack to each sub-series, they may be recombined using the reconstruction filter, to produce one time series with the original bandwidth. If, instead of a diversity stack, the sub-series were stacked vertically, the final time series would be exactly the same as applying the vertical stack on the original set of time series. Hence, where the S/N ratio is very good and the power of each time series are nearly equal, the QM diversity stack will give the same result as the vertical stack.

While the concept of splitting seismic data into frequency bands has been suggested previously (see e.g., U.S. Pat. No. 3,398,396), in practice, difficulties and costs have prevented effective implementation. In order to be effective, according to the present invention, the method for band splitting should have relatively low reconstruction error. That is, after splitting the signal the preferred method would ideally reconstruct the data exactly. The method should also preferably have low computational cost and not increase the volume of data to be dealt with. According to the invention, techniques such as Quadrature Mirror (QM) filtering, or Conjugate Mirror (CM) filtering have been adapted to effectively provide frequency band splitting.

Mirror filters such as QM and CM are a particular example of the more general technique of sub-band sampling. The idea behind sub-band sampling is relatively straightforward. Given a signal with bandwidth F, sampled at its Nyquist frequency F/2, convert it into n sub-signals, each with bandwidth F/n and sampled at frequency F/2n. For this process to be useful it should be fully reversible so that the original signal may be reconstructed from the n band-limited sub-signals.

For the case $n=2^m$ for some integer m this process can be done computationally efficiently through the use of mirror filters. A good reference on QMF theory and design is Smith and Barnwell III (1986), "Exact reconstruction techniques for tree-structure subband coders", *IEEE Trans. Acoust. Speech and Sig. Process.* ASPP-34, 434–441, which is incorporated herein by reference.

Figure 6:
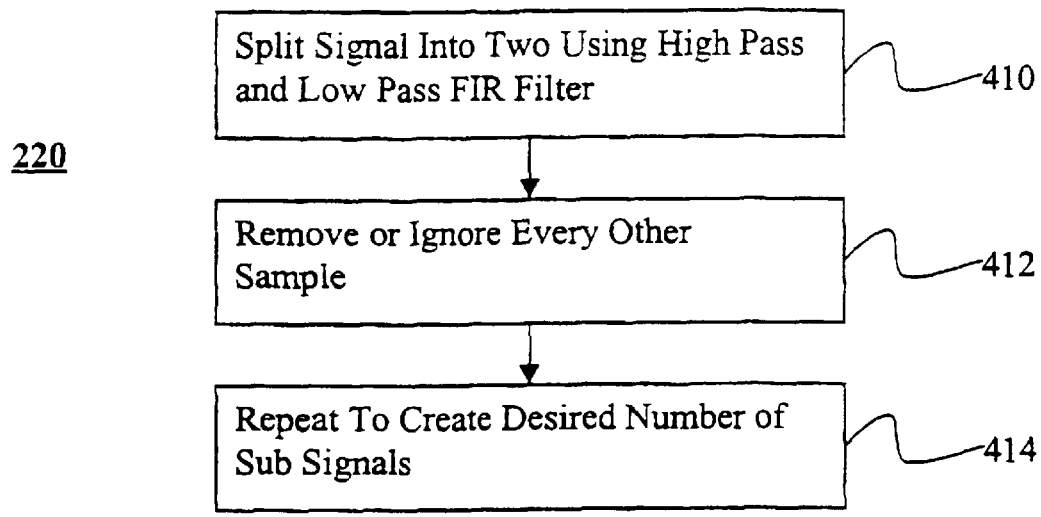
FIG. 6 illustrates an example of a technique for digitally transforming time domain traces into time-frequency domain traces, according to the invention.

Referring to step 410 in FIG. 6, a time series signal is split into two using a high-pass and low-pass finite impulse response (FIR) filter. In step 412, every other sample is then removed. Alternatively, every other sample is not calculated. In order to split the time series into $2^m$ sub-signals, the splitting operation is repeated m times in step 414.

Figure 9:
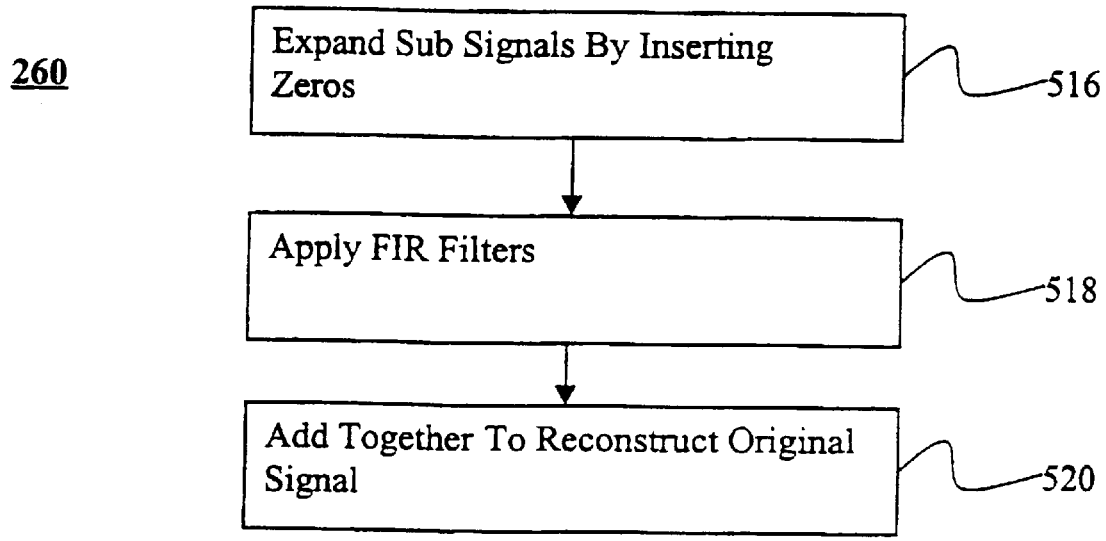
FIG. 9 illustrates an example of a technique for digitally transforming frequency time domain traces back into time domain traces, according to the invention.

Reconstruction similarly requires m operations. To later reconstruct the original time series, the sub-series are expanded by inserting zeros between each data point, filtered using FIR filters, and added together. This technique is illustrated in steps 516, 518, and 520 of FIG. 9. With correctly designed filters this reconstruction process can be exact. The reconstruction filters are preferably the time-reverse of the splitting filters. The filters are termed mirror filters because the power spectrum of the high-pass filter is the power spectrum of the low-pass filter "mirrored" at half the Nyquist frequency. By definition the power spectra have the same value of 0.5 at half the Nyquist frequency, so there should be some overlap in the frequency response of the two filters.

Figure 10:
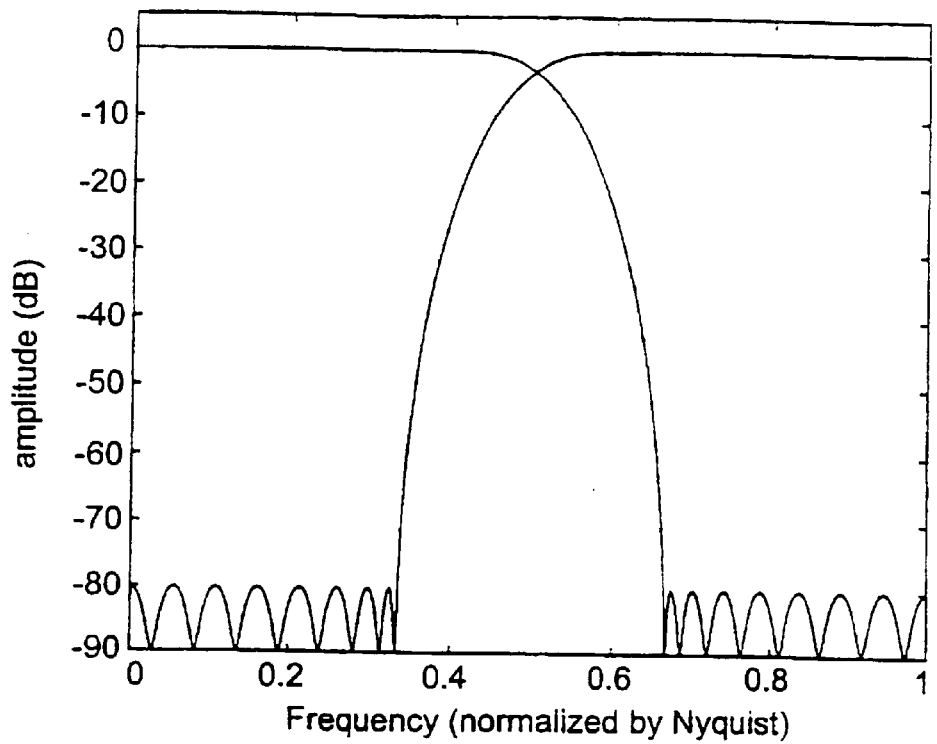
FIG. 10 illustrates an example of power spectra of a pair of high and low pass mirror filters, and their convolution, according to the invention.
Figure 11:
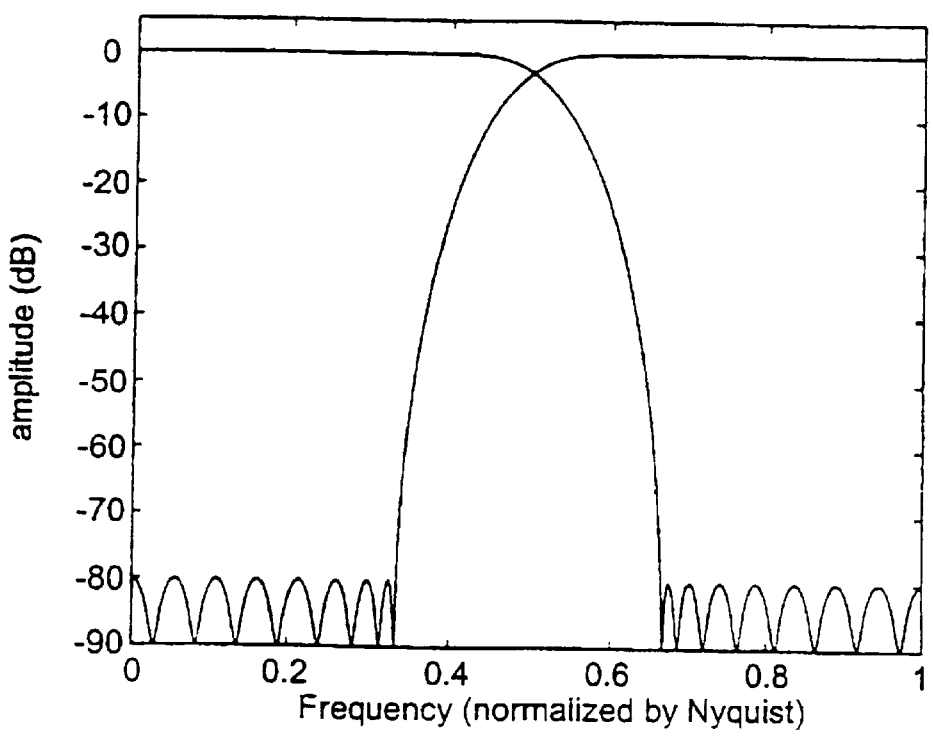
FIG. 11 illustrates an example of power spectra of high and low pass mirror filters on a dB scale, according to the invention.

An example of a suitable filter is shown in FIG. 10. In FIG. 10, solid lines show the power spectra of a pair of high and low pass mirror filters, the dashed line shows the power spectrum of their convolution. FIG. 11 shows power spectra of the high and low pass filters on a dB scale. The filters depicted in FIGS. 10 and 11 have been designed to have an 80-dB attenuation in the stop bands. The attenuation in the stop band of the high pass filter is the same as the ripple in the pass band of the low pass filter, which enables the exact reconstruction of the original time series from the filtered sub-series. The filters whose power spectra are shown in FIG. 11 have 32 elements.

Figure 12:
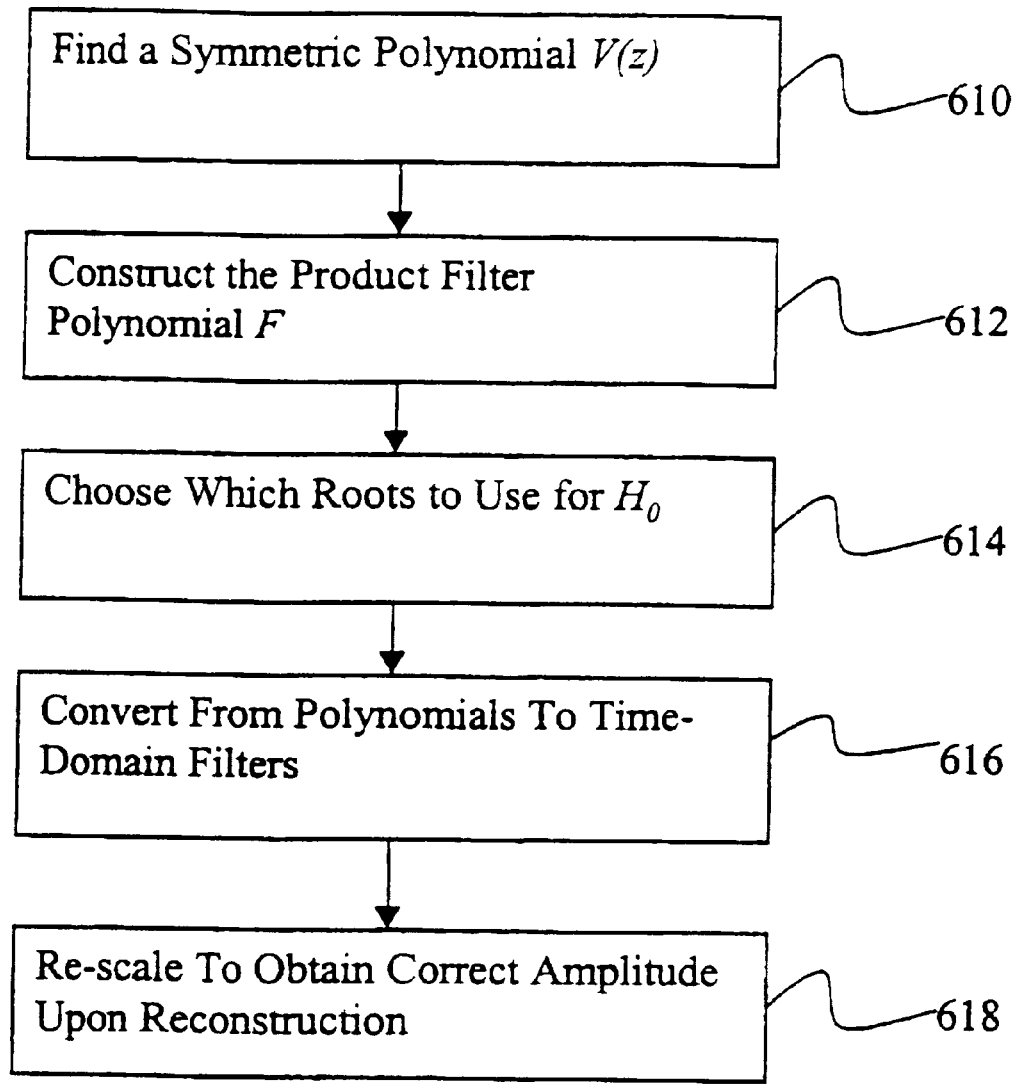
FIG. 12 illustrates an example of a technique for creating mirror filters, according to the invention.

FIG. 12 illustrates the steps in creating a suitable QM filter according to a preferred embodiment of the invention. QM filter construction is similar to other methods of designing FIR filters with prescribed properties. The difference is that the filter, once designed, is split into two, the high and low pass filters. The FIR filter that is constructed is the product of the low-pass splitting filter and the high-pass reconstruction filter.

The first step, 610, is to find a symmetric polynomial V(z) (an order X polynomial is symmetric if the nth coefficient is equal to the (M+1−n)th) of the right order that passes through the origin and also obeys $V(e^{i\theta})+V(-e^{i\theta})=0$. This implies that the product filter will be anti-symmetric about the half-Nyquist frequency. Looked at as a polynomial in cos (θ), V is a polynomial in odd powers of cos (θ). Let W (cos (θ))=$V(e^{i\theta})$. If the final filter length is to be N, then W is an order (N−1) odd polynomial with real maxima and minima whose maxima are all less than ½ and whose minima are greater than ½−ε where −10 $\log_{10}$ε is the desired stop-band attenuation in dB.

Finding a polynomial that fits these criteria can be done using a method such as described in Oppenheim & Schafer 1975, *Digital Signal Processing*, Prentice Hall, pp. 255–269, which is incorporated herein by reference. An initial guess is made at the points through which the polynomial will attain its maxima and minima, and (using LaGrange interpolation) the unique polynomial is constructed that has the desired values of maxima (less than ½, e.g. ½−ε/10) and minima (e.g. ½−ε) at these values. This polynomial will pass through these values, but will have its maxima and minima elsewhere. For the next guess the actual locations of the maxima and minima are used as the interpolation coordinates, with the polynomial constructed to have desired maximum and minimum values there. This is repeated until the polynomial's maximum and minimum values are within the desired bounds. Although it is not known that this procedure always converges, in practice with a sensible initial guess at the locations of the maxima and minima the procedure quickly produces a polynomial with the right properties. The LaGrange interpolation process involves inverting a badly conditioned matrix so there are limits on the stop-band attenuation and filter length that can be practically achieved using double-precision arithmetic. It has been found that it is difficult to construct filters with more than 40 elements, and that the attenuation limit for a 32-element filter is around 90 dB. Since the product filter has twice the attenuation of the individual high and low-pass filters it may be possible to circumvent these limits by using higher-precision arithmetic to construct the product filter, and to then revert to double precision for the final filters.

In step 612, given a W with the correct maxima and minima we may construct the product filter polynomial F, defined by $$F(e^{i\theta})e^{-((N-1)i\theta}=W(\cos(\theta))+\tfrac{1}{2}$$

for instance if $$W(\cos(\theta))=2\cos(\theta)$$

then $$F(z)=1+\tfrac{1}{2}z+z^2$$

F is a strictly positive function for all real θ. Now F is the product of the high and low pass QM filters. Its symmetry properties imply that $$\frac{F(z)}{z^N} = K \prod_{i=1}^{N} (z+z_m)\left(\frac{1}{z}+z_m\right)$$

for some constant K. The polynomials corresponding to the analysis and reconstruction filters are given by $$H_0(z) = \left[\sqrt{K} \prod_{m=1}^{N} (z-z_m)\right] z^{-N}$$

$$H_1(z) = \sqrt{K} \prod_{m=1}^{N} (z^{-1}+z_m)$$

$$G_0(z) = \sqrt{K} \prod_{m=1}^{N} (z^{-1}-z_m)$$

$$G_1(z) = -\left[\sqrt{K} \prod_{m=1}^{N} (z+z_m)\right] z^{-N}$$

where $H_0$ and $H_1$ are the polynomials corresponding to the low and high-pass splitting filters respectively, $G_0$ and $G_1$ those of the low and high-pass reconstruction filters.

The choice of which roots to use for the $H_0$, in step 614, is arbitrary. If all the zeros of $H_0$ are within the unit circle then $H_0$ will be minimum phase, and $H_1$ will be maximum phase. It has been found that following the suggestion in Smith & Barnwell III (1986) to take alternating zeros inside and outside the unit circle, gives nearly linear phase.

Step 616 involves converting from polynomials to time-domain filters (i.e. taking the polynomial coefficient). The filter coefficients are related by $$h_1(n)=(-1)^{n+1}h_1(N+1-n)$$

$$g_0(n)=h_0(N+1-n)$$

$$g_1(n)=(-1)^n h_0(n)$$

for 1<n<N

A signal split into 2 sub-series and then reconstructed will have half the amplitude of the original signal, if $g_0$ and $g_1$ are not re-scaled. This is because the interpolation procedure alternates the sub-series with zeros before filtering. To produce the original time series, the filters $g_0$ and $g_1$ are preferably multiplied by 2 in step 618.

Although QM filters are described here in a preferred embodiment, other time-frequency methods such as overlapping short Discrete Cosine Transforms (DCT) Discrete Sine Transforms (DST) are also applicable.

Figure 7:
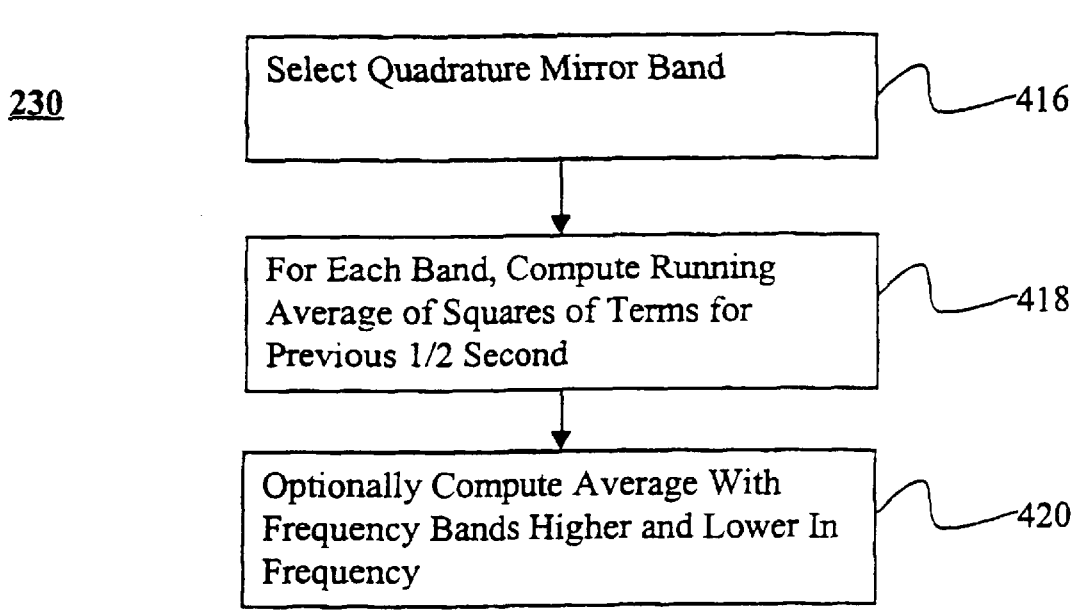
FIG. 7 illustrates an example of a technique for calculating a noise estimate, according to the invention.
Figure 8:
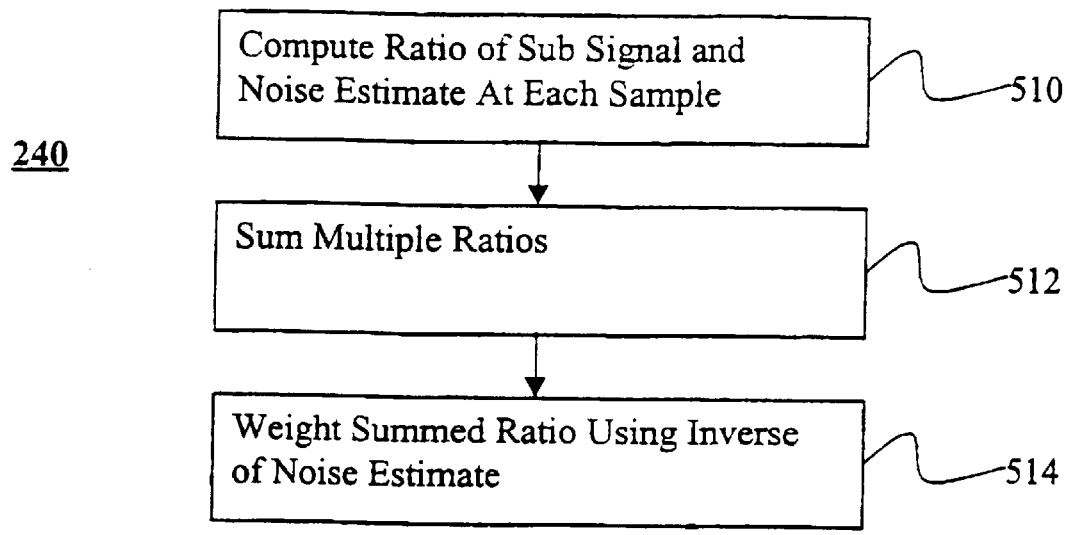
FIG. 8 illustrates an example of a technique for summing multiple time-frequency domain traces, according to the invention.

FIGS. 7 and 8 illustrate the application of a diversity stack to the band-separated data. In step 416 of FIG. 7, a single band is selected. For each band, the running average of the squares of the terms for a ½ second window is computed in step 418. The time series sample at the end of the window is weighted by the inverse of the power in the window before stacking. This is preferably done rather than using a centered window because impulsive seismic noise is often followed by lower amplitude reverberation, whereas using a centered window will down-weight the signal that arrives before the impulsive noise. A variation on this technique, shown in step 420, involves extending sideways into other frequency bands as well. For each band the noise estimate is calculated as the average of the in-band noise with the in-band noise of bands higher and lower in frequency.

FIG. 8 illustrates the preferred weighting technique in greater detail. In step 510 the ratio of the sub-signal and noise estimate for each sample is computed. In step 512 multiple ratios are summed. In step 514 the summed ratios are weighted using the inverse of the noise estimate. This can be expressed as $$\left[\sum \frac{A_i}{B_i}\right] / \left[\sum \frac{1}{B_i}\right]$$

where A is the data, and B is the noise estimate.

The technique described, using a time-frequency domain (such as QM bands or DCT decomposition) diversity stack, has been found to be very effective in reducing noise where all the traces being added have similar amplitude signal components. Where the signal to noise ratio is generally not good (due to random noise or vibrator generated ground roll) the weights will be noise dominated, and hence this method will still work well. In cases where the signal to noise ratio is good, the final stacked signal to noise maybe slightly less than for an equal weight stack.

However, the described technique may be less effective where the signal component on each trace is the same but of different amplitude. According to the invention, a technique can be used for balancing the requirements of down-weighting traces with harmonic noise with a varying amplitude signal.

Figure 15:
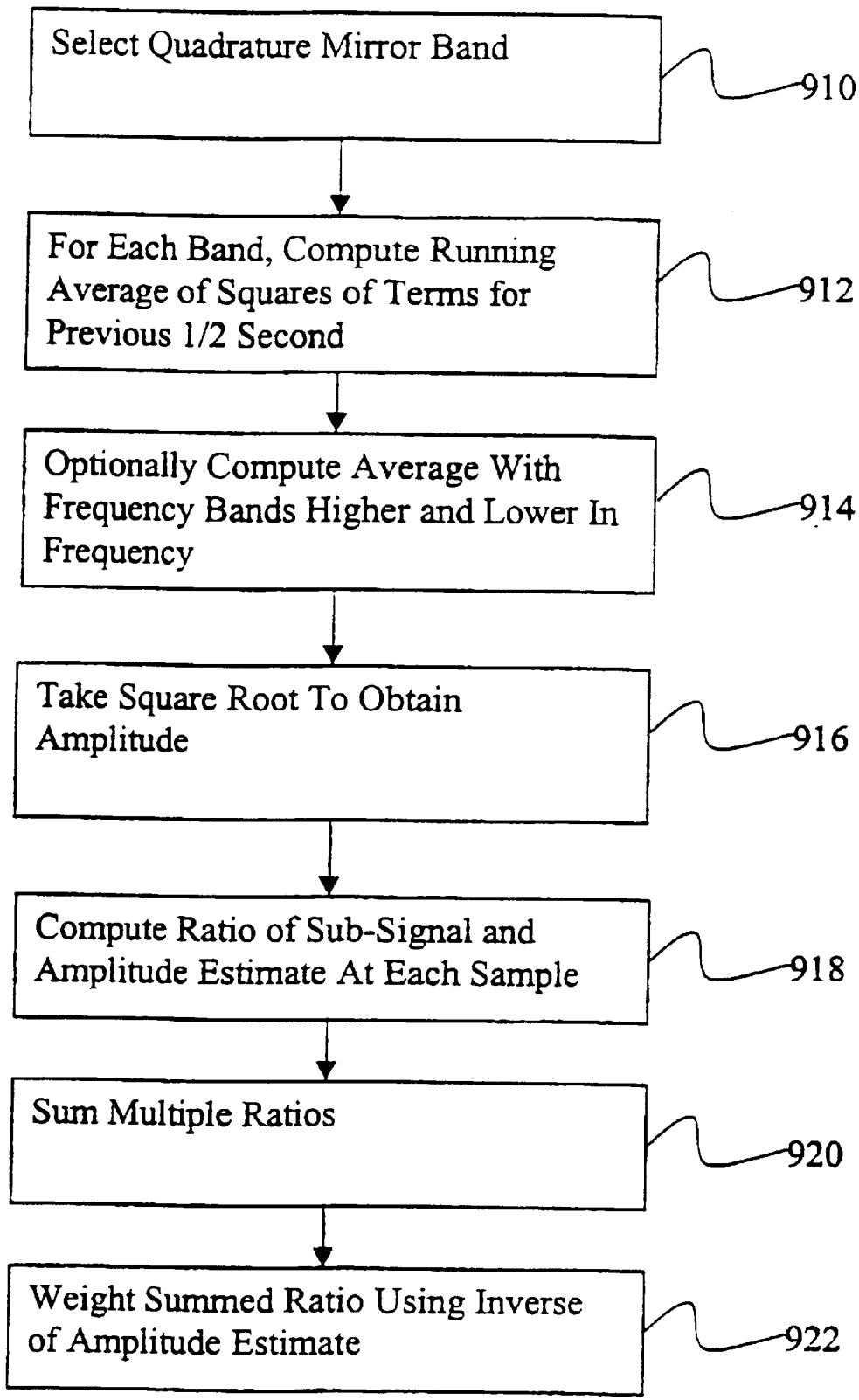
FIG. 15 illustrates examples of techniques involving the use of an automatic gain control stack, according to the invention.

In particular, according to a further embodiment of the invention, a technique is provided that uses an AGC (automatic gain control) stack rather than a diversity stack. An example of this technique is illustrated in FIG. 15. Steps 910, 912 and 914 are analogous to the three steps in FIG. 7. Next, in step 916, the square root is taken to obtain the amplitude. Steps 918, 920, and 922 are similar to the steps in FIG. 8, except that the amplitude is used for the weighting rather than the power. One potential drawback of this technique is that adding a noisy trace will decrease the signal-to-noise ratio. However, this technique has the advantage that adding a low amplitude but clean signal will improve the final signal-to-noise ratio.

Figure 16:
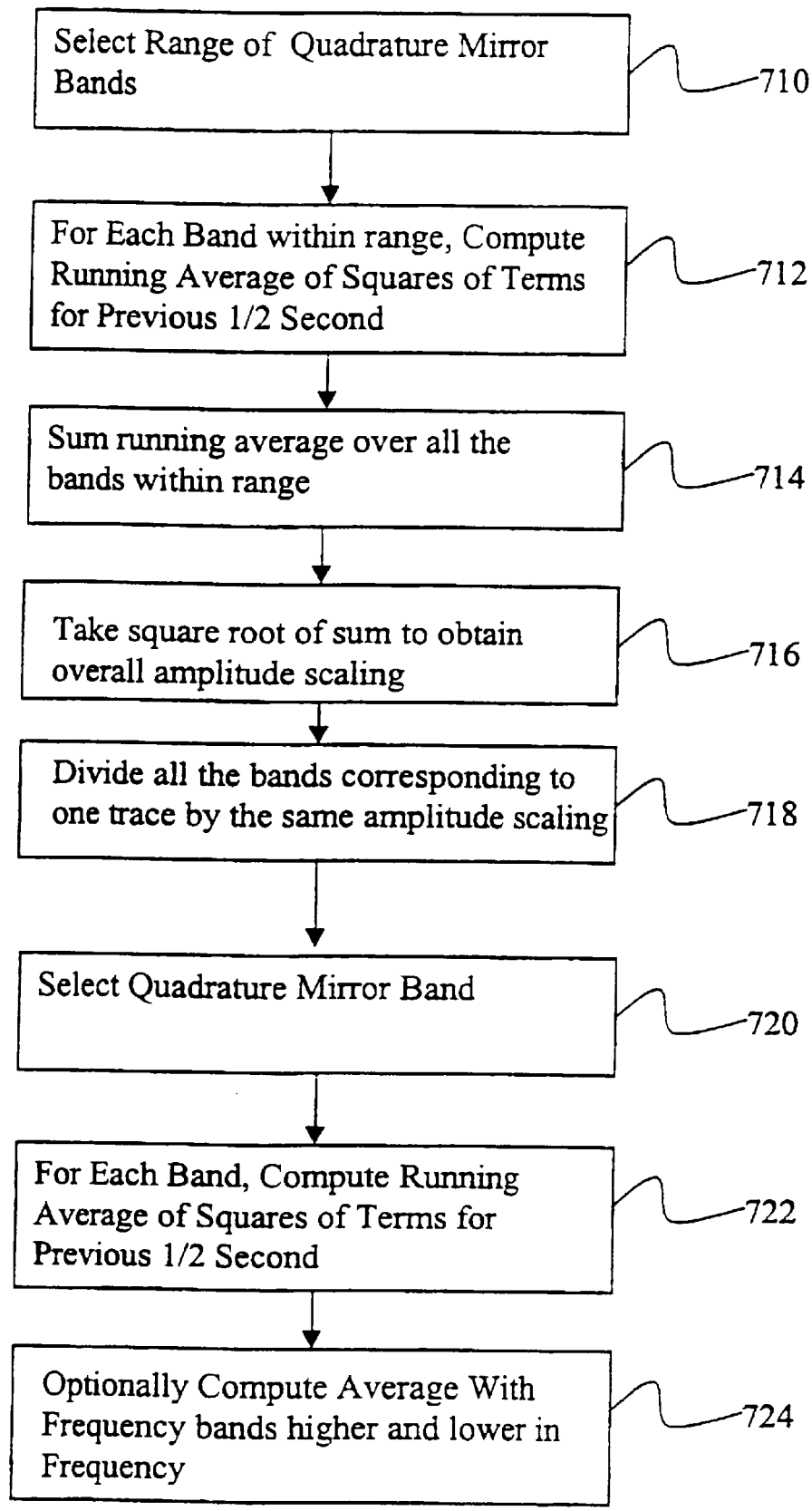
FIG. 16 illustrates examples of techniques involving the use of an automatic gain control stack in combination with a diversity stack, according to the invention.

According to another embodiment of the invention, a combination of AGC and diversity stack is provided. An example of this technique is illustrated in FIG. 16. In step 710, a range of Quadrature Mirror bands is selected. This range is preferably at least two bands in size and can be up to the entire bandwidth of the data. After splitting into time-frequency bands the traces are weighted according to their relative inverse amplitude (a diversity stack would weight according to the relative inverse energy). In particular, in step 712, a running average of squares of the terms is computed for each band within the chosen range. In step 714, the running average is summed over all the bands within the chosen range. In the case where the entire bandwidth is chosen as the range of bands, the running average would be computed on the original data directly, and no averaging over bands would be necessary. In step 716, the square root of the sum is taken to obtain the overall amplitude scaling. Then, in step 718, all the bands corresponding to one trace is divided by the same amplitude scaling. This technique will be particularly effective where some frequencies have high noise but others do not. If the overall contribution of the harmonic noise is low (as it normally will be) then the trace amplitude will be dominated by the signal component. Therefore, after inverse amplitude weighting the signal components will be of approximately equal weight. In steps 720 and 722, these traces are now summed using a time-frequency diversity stack as described above with respect to FIGS. 7 and 8.

An example of the effects of the present invention is illustrated in FIGS. 13 and 14. FIG. 13 shows seismic data after stacking using a conventional diversity stack. The data contains a substantial amount of harmonic noise introduced from subsequent vibratory sweeps during slip-sweep data acquisition. The vibrators swept between 5 and 120 Hz in 10 seconds, with a 4 second listening time—four vibrators sweeping individually before moving up to the next set of shot points. Thus the first two shots contain harmonic energy from two subsequent shots, and the third shot contains harmonic energy from one following shot. FIG. 14, in contrast, reflects data that has been processed according to the present invention. Notice that a substantial amount of the harmonic noise present in the FIG. 13 has been attenuated. The data were split into time-frequency bands using QM filters, and each band was diversity stacked using noise estimates calculated within each band. After stacking the data was digitally transformed back to the time domain.

Figure 17:
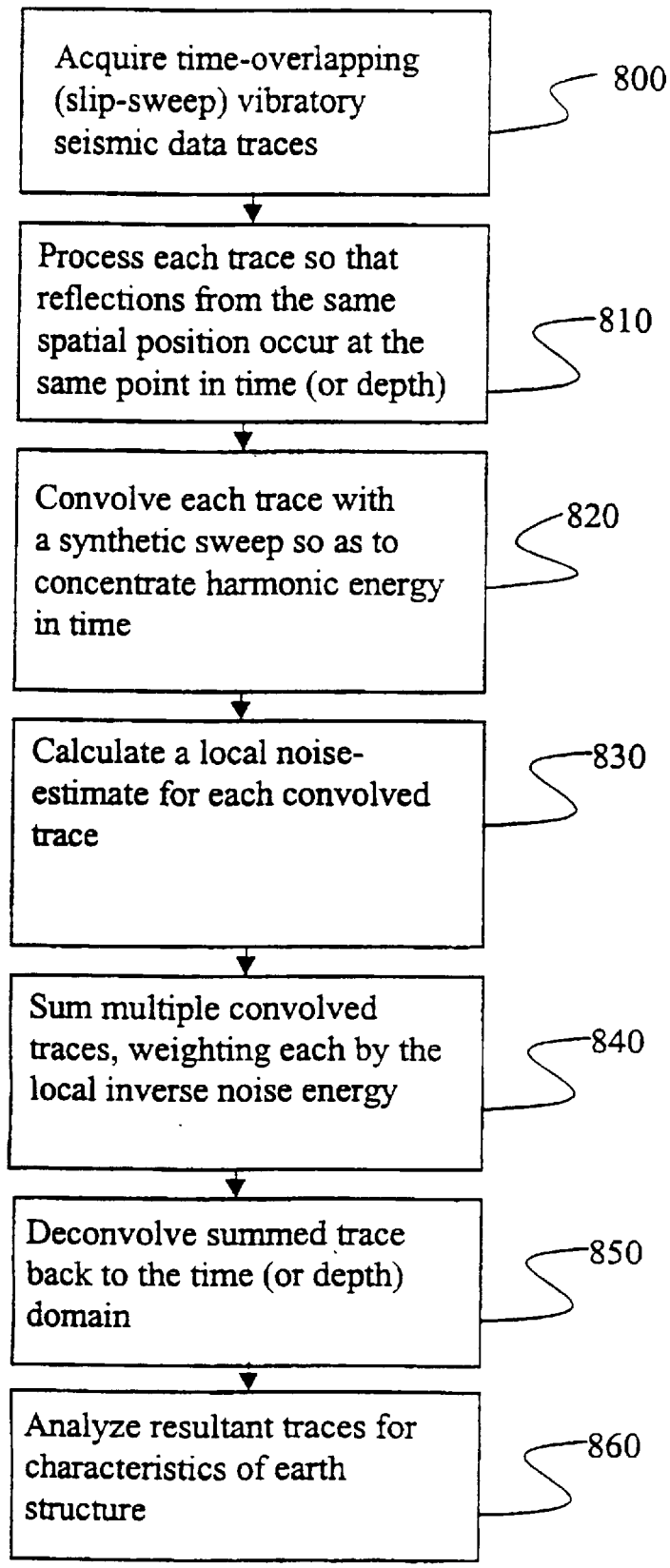
FIG. 17 illustrates an alternative example of a data acquisition and noise reduction process, according to the invention.

According to a further preferred embodiment of the invention, an alternative technique is provided which is depicted in FIG. 17. The alternative technique involves transforming all the traces in the gather so that the harmonic energy is concentrated into as short a time interval as possible, applying a time-domain diversity stack to the traces and then reversing the original transformation on the resultant stacked trace.

Steps 800, 810 and 860 are implemented in a similar or analogous fashion as the embodiments described above and will therefore not be discussed again in detail. During acquisition the vibrator fundamental frequency changes with time at a rate R Hz/s from frequency f0 to frequency f1, taking time T. The energy that has the same travel time from source to receiver is also spread over T seconds. The $2^{nd}$ and $3^{rd}$ harmonics change at rates 2R and 3R respectively from 2f0 to 2f1 and 3f0 to 3f1. The correlation process is performed as described in step 210, above, and therefore all the fundamental energy that has the same travel time from vibrator to receiver appears at the same time, but the harmonic energy is still spread out. The trace can still be correlated with the fundamental, and the harmonic energy at one sweep rate can be aligned in time by convolving with a sweep whose frequency changes at the correct rate.

There are a number of ways of exploiting this at the stack stage, in order to use a time-domain diversity stack to attenuate the harmonic energy. Although these methods will not be as effective as the time-frequency diversity stack, they may fit more easily into the standard computational flow.

If the harmonic energy comes from one harmonic in particular, each trace may be convolved with a synthetic sweep before being stacked using a time-domain diversity stack, as shown in step 820. In step 830, a local noise estimate for each convolved trace is calculated. This is analogous to step 230 in FIG. 4. Next, in step 840, multiple convolved traces are summed and each trace is weighted by the local inverse noise energy. The final stacked trace is then correlated or deconvolved with the synthetic sweep to reverse the transformation, as shown in step 850. If the dominant harmonic energy comes from the $2^{nd}$ harmonic, the sweep must go at rate 2 R. If the dominant harmonic energy comes from the $3^{rd}$ harmonic the sweep rate is 1.5 R. If the energy comes from both harmonics, then using a sweep rate intermediate between these two will still concentrate the harmonic energy into a shorter time interval, and so still increase the effectiveness of the time-domain diversity stack. For instance a sweep rate of 1.75 R will spread the $2^{nd}$ and $3^{rd}$ harmonic energy equally in time.

Note that although for purposes of clarity of description the individual steps in the foregoing FIGS. are depicted separately, in practice when the invention is implemented using a digital computer, many of the steps may be done in parallel, or in different order according to ease of programming and for computational efficiency.

While preferred embodiments of the invention have been described, the descriptions are merely illustrative and are not intended to limit the present invention. For example, although the embodiments of the invention have been described primarily in the context of attenuating noise caused by higher harmonics of subsequent but overlapping vibratory sweeps, the disclosed methods and structures are readily applicable to other applications. For example, the invention is applicable to attenuate types of noise other than harmonic noise from subsequent vibratory sweeps.

What is claimed is:

1. A method for reducing the effects of noise in seismic data acquired from overlapping vibratory sweeps comprising the steps of:

receiving raw data traces which represent sensor recordings of earth vibrations caused by a first vibratory sweep and at least some noise caused by a second vibratory sweep, the first vibratory sweep consisting of vibrations imparted into the earth during a first time period, and the second vibratory sweep consisting of vibrations imparted into the earth during a second time period, wherein the second time period begins after the start and before the end of the first time period;

processing the raw data traces to produce a plurality of seismic time domain data traces, at least some of which contain noise caused by the second vibratory sweep;

digitally transforming each time domain data trace, to generate from each time domain data trace a plurality of reduced-bandwidth data traces, wherein each reduced-bandwidth data trace contains a subset of frequencies present in the domain data traces;

weighting data from a plurality of reduced-bandwidth traces, each such weighting being performed according to an estimate of the noise for at least part of the reduced-bandwidth data trace;

summing data from a plurality of reduced-bandwidth time frequency domain data traces which in combination with said step of weighting, generates a summed and weighted data trace; and digitally transforming the summed and weighted data trace to generate a reduced noise time domain data trace which is substantially a mathematical equivalent to the summed and weighted data trace, said reduced noise time domain data trace having less noise caused by the second vibratory sweep than said time domain data traces, and being suitable for further processing and analysis to determine therefrom characteristics of an earth structure.

2. The method of claim 1 wherein said step of summing data from a plurality of reduced-bandwidth time frequency domain data traces comprises summing data from reduced-bandwidth time frequency domain data traces containing the same range of frequencies.

3. The method of claim 1 wherein the reduced-bandwidth data traces represent data in the time frequency domain and the reduced-bandwidth data traces together represent a substantial time frequency domain equivalent to the first time domain data trace.

4. The method of claim 3 wherein each of the reduced bandwidth data traces represents substantially the same size range of frequencies.

5. The method of claim 4 wherein the step of digitally transforming the first time domain data trace comprises using a mirror filtering technique to produce the reduced-bandwidth data traces.

6. The method of claim 5 wherein the mirror filtering technique used to produce the reduced-bandwidth data traces is a quadrature mirror filtering technique.

7. The method of claim 5 wherein the mirror filtering technique used to produce the reduced-bandwidth data traces is a conjugate mirror filtering technique.

8. The method of claim 1 wherein the step of digitally transforming the first time domain data trace comprises using a discrete cosine transform technique to produce the reduced-bandwidth data traces.

9. The method of claim 1 wherein the step of digitally transforming the first time domain data trace comprises using a discrete sine transform technique to produce the reduced-bandwidth data traces.

10. The method of claim 1 wherein the step of processing the raw data traces comprises processing such that reflections from substantially the same spatial position occur at substantially the same point in time in each seismic time domain data trace.

11. The method of claim 1 further comprising the step of calculating a plurality of noise estimate traces, each noise estimate trace representing the estimated noise of a reduced bandwidth data trace, and wherein the step of weighting comprises normalizing a reduced-bandwidth data trace according to the corresponding noise estimate trace.

12. The method of claim 11 wherein the step of calculating a plurality of noise estimate traces comprises computing a running average of squares for a predetermined time period of the reduced-bandwidth data trace.

13. The method of claim 12 wherein the step of calculating a plurality of noise estimate traces further comprises computing a running average for frequency ranges which are higher and lower than the frequency range of the reduced-bandwidth data trace.

14. The method of claim 1 wherein said steps of summing and weighting comprise using an automatic gain control stack technique.

15. The method of claim 14 wherein the automatic gain control stack is used in combination with a diversity stack technique.

16. The method of claim 1 wherein the noise caused by the second vibratory sweep is primarily caused by harmonic frequencies of the second vibratory sweep.

17. The method of claim 1 wherein the length of time between the start of the first time period and the start of the second time period is at least as long as the time for most of the vibrations from the first vibratory sweep to be detected by the sensors.

18. The method of claim 1 wherein the vibrations imparted into the earth that comprise the first vibratory sweep are produced by a first group of three vibrators, and the vibrations the vibrations imparted into the earth that comprise the second vibratory sweep are produced by a second group of three vibrators.

19. The method of claim 1 wherein said step of digitally transforming the summed and weighted data trace generates a reduced noise time domain data trace which is substantially an exact reconstruction of the seismic time domain data trace.

20. The method of claim 1 wherein said step of weighting and said step of summing are performed concurrently.

21. An apparatus for reducing the effects of noise in seismic data acquired using overlapping vibratory sweeps comprising:
- a memory storage containing raw data traces which represent sensor recordings of earth vibrations caused by a first vibratory sweep and at least some noise caused by a second vibratory sweep, the first vibratory sweep consisting of vibrations imparted into the earth during a first time period, and the second vibratory sweep consisting of vibrations imparted into the earth during a second time period, wherein the second time period begins after the start and before the end of the first time period;
- a pre-processor in communication with said memory storage adapted and configured to process the raw data traces to produce a plurality of seismic time domain data traces, at least some of which contain noise caused by the second vibratory sweep;
- a digital transformer in communication with said memory storage adapted and configured to digitally transform each seismic time domain data trace to generate therefrom a plurality of reduced-bandwidth data traces which correspond to the seismic time domain data trace, and wherein each reduced-bandwidth data trace contains a subset of the frequencies present in the time domain data trace;
- a processor in communication with said memory storage adapted and configured to generate a summed and weighted data trace by weighting data from a plurality of reduced-bandwidth traces according to an estimate of the noise for at least part of the reduced-bandwidth data trace and summing data from a plurality of reduced-bandwidth time frequency domain data traces; and
- a digital transformer in communication with said memory storage adapted and configured to digitally transform the summed and weighted data traces to generate a reduced noise time domain data trace which is substantially a mathematical equivalent to the summed and weighted data trace, said reduced noise time domain data trace having less noise caused by the second vibratory sweep than said time domain data traces, and being suitable for further processing and analysis to determine therefrom characteristics of an earth structure.

22. The apparatus of claim 21 wherein the reduced-bandwidth data traces represent data in the time frequency domain, the reduced-bandwidth data traces together represent a substantial time frequency domain equivalent to the seismic time domain data trace, and each of the reduced bandwidth data traces represents substantially the same size range of frequencies.

23. The apparatus of claim 22 wherein the digital transformer uses a mirror filtering technique to produce the reduced-bandwidth data traces.

24. The apparatus of claim 23 wherein the mirror filtering technique used to produce the reduced-bandwidth data traces is a quadrature mirror filtering technique.

25. The apparatus of claim 23 wherein the mirror filtering technique used to produce the reduced-bandwidth data traces is a conjugate mirror filtering technique.

26. The apparatus of claim 21 wherein the step of digitally transforming the first time domain data trace comprises using at least a discrete cosine transform technique or a sine transform technique to produce the reduced-bandwidth data traces.

27. The apparatus of claim 21 further comprising an estimate calculator adapted and configured to calculate a plurality of noise estimate traces by computing a running average of squares for a predetermined time period of the reduced-bandwidth data traces, each noise estimate trace representing the estimated noise of a reduced bandwidth data trace, and wherein the processor normalizes the data from the plurality of reduced-bandwidth data traces according to the corresponding noise estimate trace.

28. The apparatus of claim 27 wherein the estimate calculator comprises computer adapted to compute a running average for frequency ranges which are higher and lower than the frequency range of the reduced-bandwidth data trace.

29. The apparatus of claim 21 wherein said processor uses an automatic gain control stack technique.

30. The apparatus of claim 21 wherein said memory storage, processors, and digital transformers all reside on a digital computer and wherein the communication with the memory storage takes place electronically within said digital computer.

* * * * *